(12) United States Patent
Chang et al.

(10) Patent No.: US 8,139,737 B2
(45) Date of Patent: Mar. 20, 2012

(54) CALL-INITIATED SOCIAL INFORMATION ACQUISITION AND EXCHANGE

(75) Inventors: Belinda Ying-Chieh Chang, Cary, NC (US); FuYi Li, Sudbury, MA (US); Pamela Ann Nesbitt, Tampa, FL (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1198 days.

(21) Appl. No.: 11/868,572

(22) Filed: Oct. 8, 2007

(65) Prior Publication Data
US 2009/0092237 A1   Apr. 9, 2009

(51) Int. Cl.
*H04M 1/56* (2006.01)
*H04M 15/06* (2006.01)

(52) U.S. Cl. ............... 379/142.01; 379/201.01; 705/319

(58) Field of Classification Search ............. 379/142.04, 379/201.01; 705/319
See application file for complete search history.

(56) References Cited

U.S. PATENT DOCUMENTS

| | | | |
|---|---|---|---|
| 2002/0126679 A1* | 9/2002 | Morton | 370/401 |
| 2005/0216300 A1* | 9/2005 | Appelman et al. | 705/1 |
| 2010/0061531 A1* | 3/2010 | Lund | 379/142.04 |

* cited by examiner

*Primary Examiner* — Quynh Nguyen

(57) ABSTRACT

To simplify the acquisition and exchange of social information, a social information acquisition application could be triggered when the calling party initiates a call to a called party. The application adds a request to the called dialing sequence for a list of all available social information repositories associated to the called party. If multiple repositories exist, one of those repositories this selected either by the calling party or by applying selection rules. Information retrieved from the selected repository could be presented to the calling party and/or used to update social information repositories maintained on behalf of the calling party.

20 Claims, 5 Drawing Sheets

CALL-INITIATED SOCIAL INFORMATION ACQUISITION AND EXCHANGE

BACKGROUND OF THE INVENTION

The present invention relates to social networks and more particularly to the call-initiated acquisition of information from social networks.

While the term "social networks" may have only come into widespread use relatively recently, social networks have existed as long as there have been societies. Social networks represent individuals and the relationships among those individuals and are usually thought of in terms of "nodes" and "ties". At a personal level, "nodes" are occupied by individuals whose relationships with other individuals are defined by the "ties" or links between the nodes. The term "ties" has no particular meaning and can represent almost any relationship between two individuals, including but certainly not limited to common religious beliefs, kinship, common hobbies, employment, etc.

Social networks are not limited to individuals and can include institutions and relationships among those institutions. The remainder of this description will be limited to personal social networks although many of the described concepts may be applicable to institutional social networks.

Prior to the advent of global communications networks and the development of reasonably priced technologies (e.g., cellular phones and personal computer systems) that allowed large numbers of people to make use of such global communications networks, most people's social networks were developed through repeated face-to-face contacts and virtually the only "repository" of information about a social network was the human memory of each participant in the network. Consequently, typical social networks were limited in size.

As communications capabilities have grown, personal social networks have also grown in size as an individual has become able to communicate almost as readily with someone half way around the globe as with someone in their local community. While the size of an individual's social network may have grown due to improvements in communications capabilities, an individual can no longer rely on repeated face-to-face contacts to acquire and remember social information about others in that individual's social network. There may never be a face-to-face contact between two individuals and the contacts that are made, presumably digitally or by telephone, may be infrequent, reducing the opportunities for one individual to acquire social information about another individual and to commit it to memory To meet the needs of persons whose social networks have expanded and "gone digital" through their use of global communication systems, computer-based social networking websites including social information repositories or SIRs have come into being. Different websites focus on different ties between participants, such as prior attendance at a particular college or university or a common interest in a particular hobby or sports team. A common characteristic of the different websites is that the participants themselves provide personal information, typically as part of the process for registering at the website, knowing that the personal information will be made available to other participants at the same website.

Different social networking websites generally operate independently of one another, which has meant that there is no simple way to bridge the gap between repositories to make it easier to access and retrieve personal information from different repositories about the same party.

BRIEF SUMMARY OF THE INVENTION

The present invention may be implemented as a method for acquiring social information about a called party. A telephone call is initiated to a called number associated to the called party. The call information includes a request for social information about the called party. Information returned to the calling party includes the identity of one or more social information repositories associated to the called party. An access request is sent to a least one of the identified social information repositories as part of call information sent to the called number. Social information sent on behalf of the called party is retrieved.

The invention may also be implemented as a computer program product for acquiring social information about a called party. The computer program product includes a computer usable medium embodying computer usable program code. The code is configured to initiate a telephone call to a called number associated to the called party. Other code is configured to include a request for social information as part of the call information sent to the called number. Other code is configured to receive the identity of one or more social information repositories associated to the called party. The identity information is sent on behalf of the called party. Still other code is configured to send an access request to at least one of the identified social information repositories and to receive social information from the accessed repository relating to the called party.

Finally, the invention may be implemented as a computer-based system for acquiring social information about a called party in response to a telephone call from calling party to a called telephone number associated to the called party. The system includes a detector for detecting a social information acquisition prefix in calling data received from a calling party. The system further includes logic for including a request in the call information to identify one or more accessible social information repositories associated to the called party, logic for sending an access request to a least one of the identified repositories and logic for receiving social information sent on behalf of the called party.

DETAILED DESCRIPTION OF THE INVENTION

Figure 1:
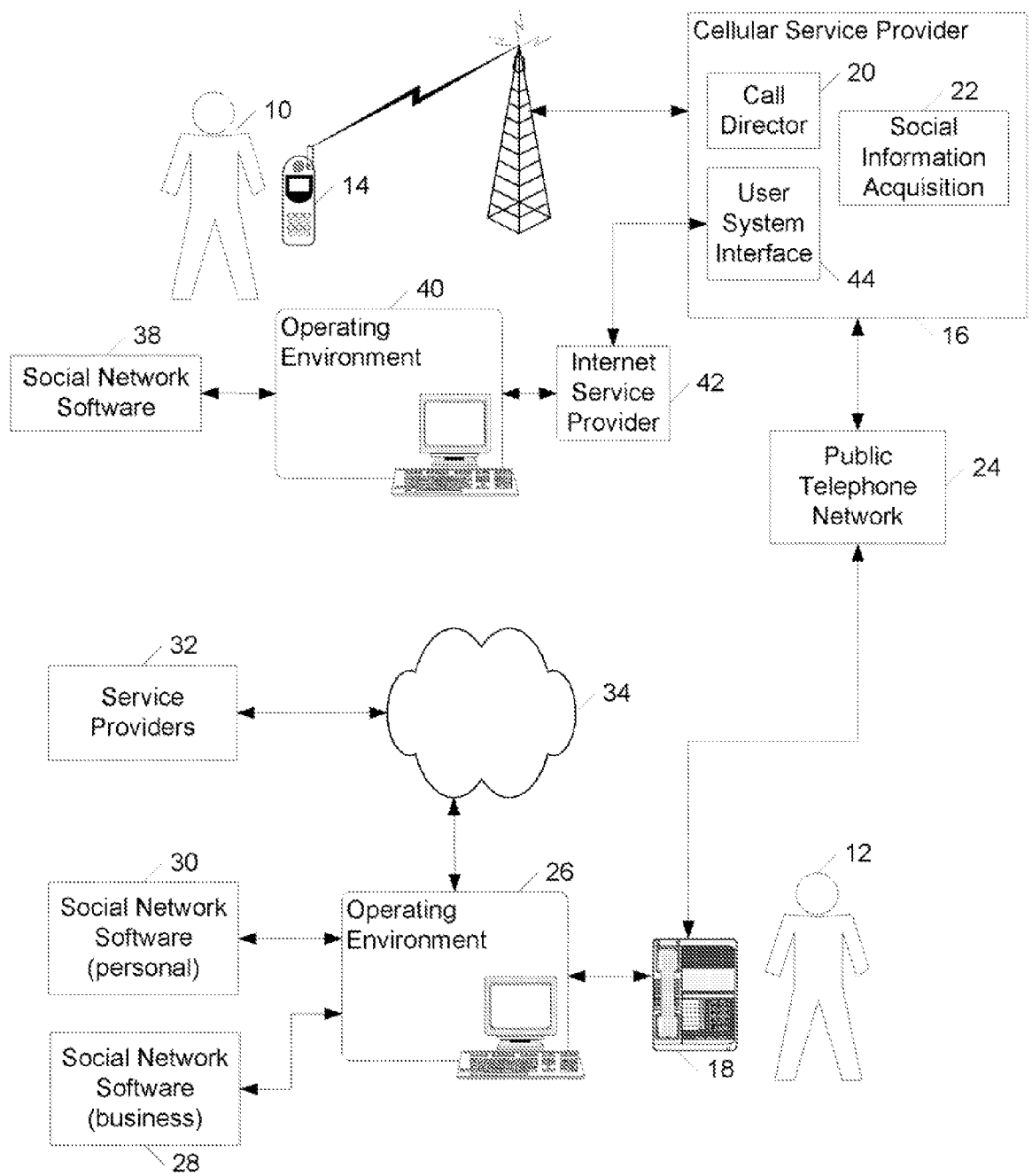
FIG. 1 is a schematic illustration of a system for implementing the present invention including the system environment for both the calling party and the called party.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet, or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, it is assumed that a request for social information is initiated by the calling party 10 in placing a call to a called party 12 through a cellular telephone 14. Radio signals generated by the telephone 14 are detected and analyzed in a system operated by a cellular service provider 16. Conventionally, the calling information transmitted by the cellular telephone 14 would identify the instrument (i.e., the cellular telephone) from which the call originated and would include a multi-digit number identifying a telephone 18 associated with the called party 12. In one embodiment of the invention, the calling party may add a control prefix to the calling information, that is, a specific sequence of signals that call director logic 20 in the cellular service provider system 16 will recognize as a request for social information about the called party 12.

If the control prefix is detected, the call director logic 20 initiates a social information acquisition (SIA) application 22 that causes control signals (to be described later) to be added to the stream of calling information supplied to a public telephone network 24 on the path to the telephone 18 associated to the called party 12. If the control prefix is not detected, the SIA application 22 is not activated and conventional signaling information is passed on to the public telephone network 24 by the system 16.

For the sake of simplicity, a single cellular service provider system 16 is shown in the drawing. In reality, there is no guarantee that the calling party 10 will, when placing a call, be within a territory serviced directly by the cellular service provider with whom the calling party has a contract for service. The caller may be "roaming" outside of his cellular service provider's home territory and the call may actually be detected by a cellular service provider with whom the calling party has no direct relationship. If that is the case, the detected call would be routed through a series of one or more providers before reaching a system 16 having the call director logic 20 and the SIA application 22.

Assuming the calling party 10 has initiated a call that includes a request for social information about the called party 12, control signals added by the SIA application 22 include requests for the identity of one or more social information repositories (SIRs) associated to the called party 12 through the number of the called telephone 18. In the simplest case, a SIR may be maintained by the cellular service provider 16 as part of a social network software application made available to its subscribers. More typically, one or more SIRs may be maintained by social network software running in an operating environment 26 associated to the called party 12 and accessible through the telephone system. The operating environment may be controlled by the called party's telephone service provider or by the called party as part of a home or business network.

The same individual may participate in multiple social networks. For example, the individual's employer may operate business-oriented social network software 28 that provides contact information and other job-related information (e.g., job title, department, manager, technical strengths, languages spoken, etc.) about the individual. At the same time, the individual may participate directly using personal social network software 30 that allows the individual to make available personal information (e.g., photographs, contact information, hobbies, likes and dislikes, etc.) to others belonging to the same personal social network. Further, the called party may participate in remote social networks operated by service providers 32 through a network 34 connected to the called party's system 26.

When the call placed to the called party 12 includes a request for social information, the call information returned to the cellular service provider 16 includes the identity of one or more of the SIRs associated to the called party 12. Depending upon the objectives of the calling party 10 in placing the call, some of the identified SIRs may be more relevant than others. Clearly, if the call had been placed to deal with a business matter, the calling party would be more interested in business-oriented SIR information about the called parry than in personally-oriented SIR information. For that reason, the social information acquisition application 22 operated by the cellular service provider 16 preferably includes rules that can be used in selecting an appropriate SIR in a set of SIRs identified to the calling party 10. More detail about preferred SIR selection rules is provided below.

Once an appropriate SIR is selected, a request for access to that SIR is returned to the called party system, which takes the necessary steps to extract appropriate information from SIR and return it to the service provider 16 for the calling party 10. In most cases, the calling party 10 will want to see a display of the extracted information on the cellular telephone display screen. If the cellular service provider 16 supports social network software, the calling party 10 may desire that the extracted information be used to update the called party's records in such software. As an example, if the cellular service provider offers a "circle of friends" service which provides free calls to friends within a calling circle established by the calling party, the extracted information might be used by the provider to update the current circle. Finally, the calling party 10 may desire that the extracted information be transferred to other social network software 38 applicable to a system 40 operated by the calling party. To this end, the cellular service provider 16 includes a user system interface 44 which can communicate with system 40 through an Internet service provider. The user system interface 44 might, for example, be used to update the social network software 38 to indicated that the call had occurred.

Figure 2:
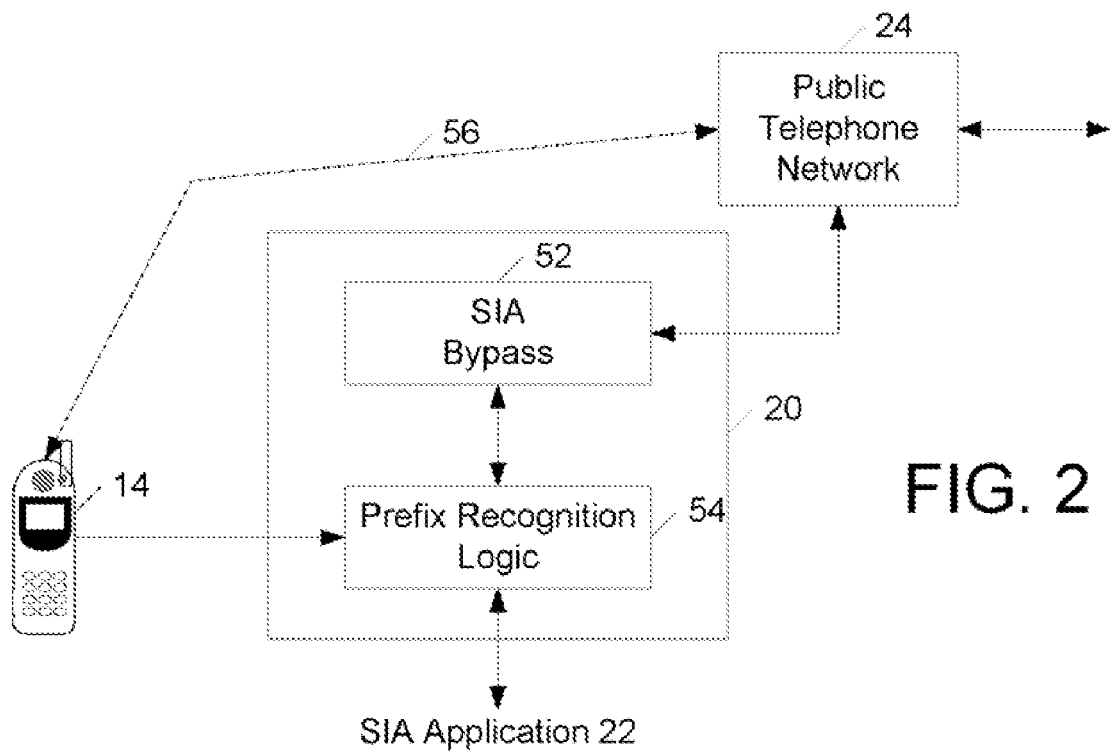
FIG. 2 shows the essentials of call director logic that makes a determination whether use of the invention is to be invoked via a calling party.

As noted earlier, a calling party may not be looking for social information on every call placed using the cellular telephone 14. The call director logic mentioned earlier permits the calling party to initiate requests for social information on demand rather than including such requests in every call placed. FIG. 2 is a more detailed functional representation of the call director logic 20.

As shown in FIG. 2, call detector logic 20 includes prefix recognition logic 54 for recognizing the control prefix included in the dialing sequence provided by the calling party using the cellular telephone 14. If the logic 54 does not recognize the control prefix, the call is routed through an SIA bypass circuit 52 to the public telephone network 24. From the calling party's viewpoint, it will appear as if the call has been routed directly to the public telephone network. The cellular service provider in the call detector logic will remain transparent to the calling party.

If, on the other hand, the prefix recognition logic 54 detects the control prefix, an activation signal is sent to the SIA application 22. Depending on whether the user preferences show that the calling party wants to receive available social information about the called party before actually talking to the called party, call completion may be deferred. Call completion can be deferred by sending calling information through the public telephone network 24 only after social information about the called party has been received and acknowledged by the call detector logic 20. Otherwise, the calling information may be sent without waiting for the results of a search for social information, which means that the calling party may not actually receive the social information until he or she is already online with the called party.

Figure 3:
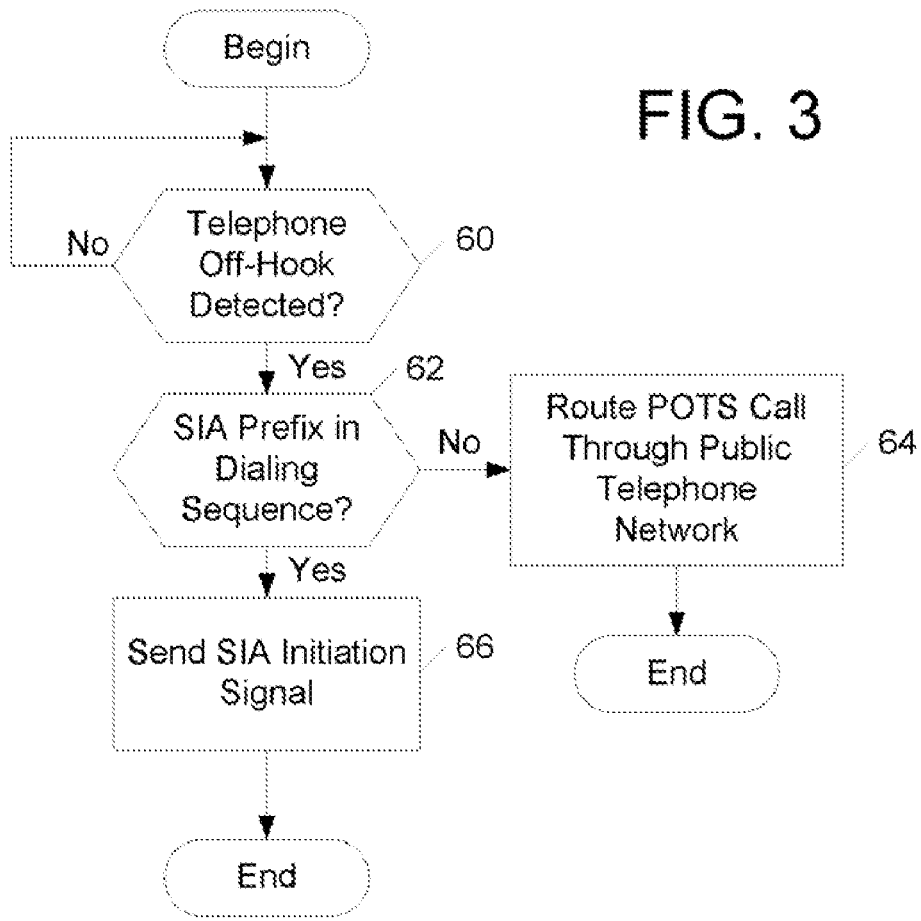
FIG. 3 is a flow chart of operations performed by the call director logic.

FIG. 3 is a flow chart showing the basic operations performed by the call detector logic 20. The call detector logic initially operates in a wait state in which the detector waits for a telephone off-hook signal in a wait loop including operations 60. When an off-hook signal is detected, the calling sequence is analyzed in an operation 62 to determine whether the control prefix is included within the calling sequence. If the operation 62 finds the control prefix, an SNI initiation signal is sent in an operation 66. If the control prefix is not located, operation 62 provides an instruction that will cause the calling signal to be routed directly through a public telephone network and no efforts will be made to find or retrieve social information about the called party.

Figure 4:
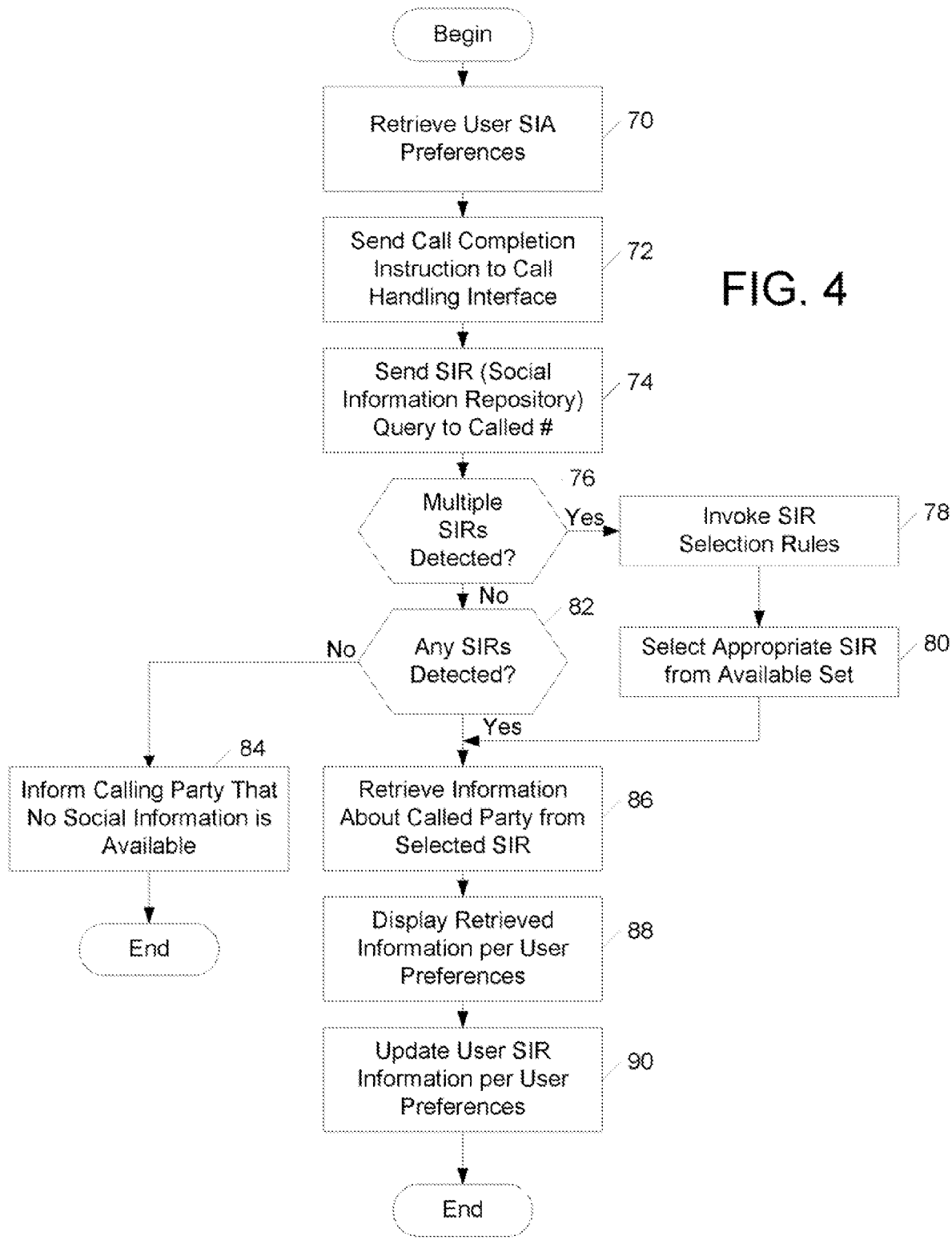
FIG. 4 is a flow chart of system operations carried out by the present invention.

FIG. 4 is a flow chart of operations that are performed under the control of the SIA application 22 assuming the prefix recognition logic did detect a sequence interpreted as a request for social information about the called party. User preferences are retrieved and an operations 70. Some user preferences have already been discussed, such as whether the user wishes call completion to be deferred until available social information can be retrieved and reviewed by the calling party and whether the calling party wishes to have retrieved social information saved in one or more social information repositories maintained for the benefit of the calling party.

Assuming one of the available user preferences is whether or not to defer completion of a call until available social information can be received to and reviewed, a "defer" or a "do not defer" instruction is sent to the call handling interface in an operations 72. A SIR or Social Information Repository query is forwarded to the called telephone number in an operation 74. This query basically asks for a list of known SIRs associated to the called party through the called telephone number.

If the response returned from the called telephone number indicates there are multiple SIRs associated to the called party (as shown in operation 76), then SIR selection rules are invoked in an operation 78, leading to selection of a SIR that is believed to be appropriate for the context of the telephone call. For example, if the telephone call is made in a business context, the SIR selection Riles should result in the selection of a SIR containing appropriate "business" social information. Possible SIR selection rules are described with reference to a later figure.

If the operation 76 had not indicated the existence of multiple SIRs, a test 82 would then need to be made to determine whether a single SIR had been detected. If the test 82 showed that no SIR was detected, the system would send a message to the calling party (in operation 84) indicating that there was no available social information and the SIA application 22 would end active operation.

If, on the other hand, the test 82 had shown the existence of a single SIR or if the invocation of the SIR selection rules had resulted in the selection of a single SIR in a set of available SIRs, then social information would be retrieved about the called party from the selected SIR in an operation 86 and displayed to the calling party in an operation 88 if the calling party had established a preference that retrieved information be displayed, most probably on a cellular telephone or other telephone display. Concurrently, one or more SIRs maintained on behalf of the calling party could be updated in accordance with the user preferences of the calling party.

Figure 5:
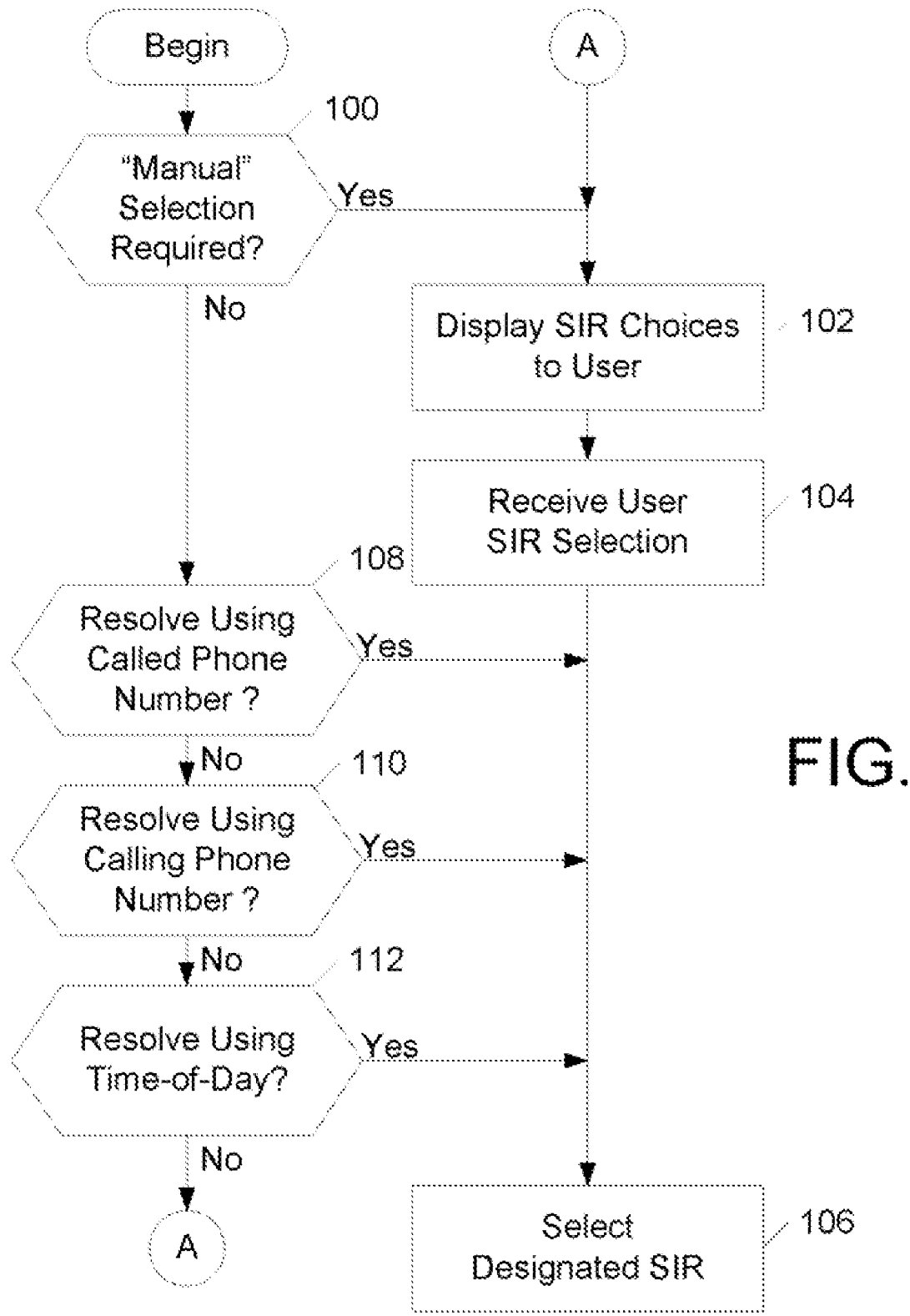
FIG. 5 is a flow chart of operations that are performed in selecting one of several possible social information repositories associated to a called party.

FIG. 5 is a flow chart of rules that could be invoked to select a single SIR when the query showed multiple SIRs associated to the called party through the called telephone number. An initial operation 100 would determine whether the calling party had entered a preference indicating that the calling party always wanted to make the selection of a single SIR when a set of SIRs had been detected.

If operation 100 indicates that the calling party always wants to make the selection, a list of the available SIRs would be presented to the calling party in operation 102. The calling party's response would be received in an operation 104, leading to selection of the chosen SIR in operation 106.

While the presentation of SIR choices would typically be in the form of a display on a telephone instrument, it would be within the scope of the invention to use an IVR or Interactive Voice Response system to convey the choices to the calling party and to receive and act on the calling party's choice.

If operation 100 had shown that the calling party was willing to let the system select one of the SIRs, the system could then attempt to choose a particular SIR by analyzing the called telephone number in an operation 108. If the called telephone number where recognized as being a business telephone number, perhaps on the basis of the exchange, a business-related SIR could be chosen. As an alternative or if the results of the operation 1084 were inconclusive, an attempt to 110 could be made to resolve the selection using the calling telephone number. If it was known that the calling telephone number was a business number associated to the calling party, a logical conclusion would be that the telephone call pertaining to a business matter and a business-related SIR would be selected.

As still another alternative, a "time-of-day" test might be used in an operation 112. If the system determined that the called telephone number was located in a particular time zone and that it was currently during normal business hours in that particular time zone, it can be concluded that the call probably related to a business matter and a business-related SIR would be selected.

The "time-of-day" test might also be used to warn the calling party that it was currently outside of normal business hours at the location of the called number (perhaps in the middle of the night at that location) and to confirm that the calling party still wished to complete the call.

If SIR selection rules of the types discussed above could not unambiguously make a choice of one of several available SIRs, the likely choices might then be made available to the calling party in operation 102, allowing the calling party to make the final selection in operation 104.

Figure 6:
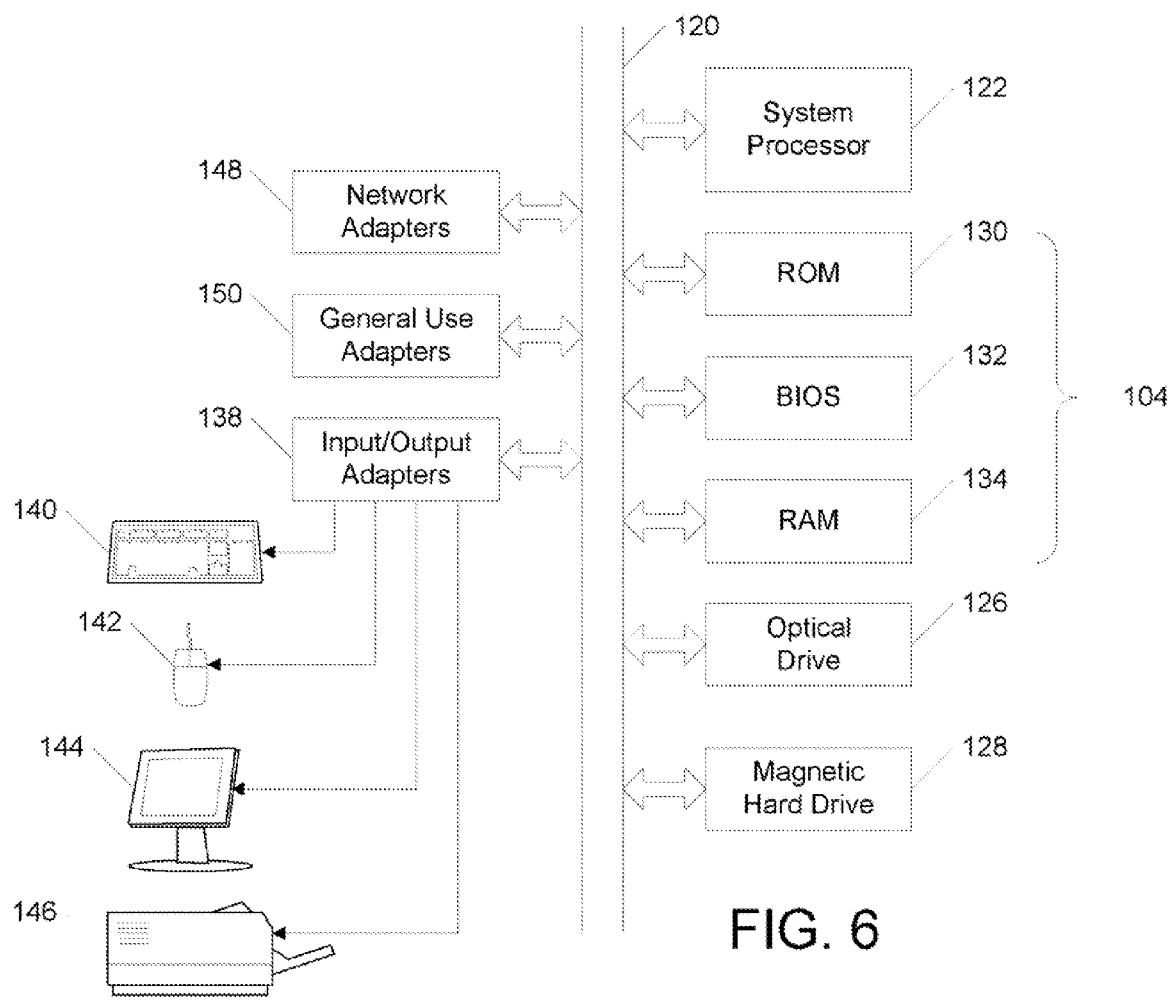
FIG. 6 is a schematic representation of the functional infrastructure of a general-purpose computer system that can be used in implementing the present invention.

The SIA application and other related logic could be implemented in a general purpose programmable computer system of the type shown in FIG. 6. A typical general purpose computer system includes an internal system bus 120, a system processor 122, internal memory components 124 and one or more "external" memory components, such as an optical drive 126 and a magnetic hard drive 128. The internal memory 124 includes specific types of memory such as read only memory (ROM) 130, basic input/out system (BIOS) memory 132 and random access memory (RAM) 134. The BIOS 132 stores configuration information for the computer system and basic routines used to control the transfer of information among the components of the computer system.

Drives, such as optical drive 126 and hard drive 128, provide non-volatile storage for applications and processes that execute in the computer system and for data used in and/or generated by those applications and processes. Depending on the technology employed, the drives may include removable media. The special purpose programming needed by a computer system to implement the described invention would typically be stored in one of these drives and transferred as needed into RAM 134. Local drives, such as those discussed above, may be supplemented by network-accessible drives.

The computer system also includes a significant number of input/output (I/O) adapters 138 that provide interfaces between a variety of input/output devices and the remainder of the computer system. Common examples of input/output devices include keyboard 140, mouse 142, monitor 144 and printer 146.

The computer system can be connected to other systems through network adapters 148, which may support wired or wireless network connections. Finally, the computer system may include what are characterized as general use adapters 150 that can be used for a number of different purposes. For example, USB (Universal Serial Bus) adapters can be used to connect typical input/output devices (such as keyboards, monitors, etc.), auxiliary memory devices, such as flash memory cards, portable hard drives and even high capacity magnetic hard drives, wireless network transceivers and many other kinds of devices to the computer system.

It should not be inferred that only the devices shown in the drawing or discussed above can be part of the computer system. There are simply too many different types of devices to include in a drawing. Moreover, it should not be implied that the input/output adapters or general use adapters are limited to the technologies mentioned. There are too many different types of device adapters to include all in the drawing. Current examples of port technologies that are successfully used include not only USB, but also serial ports, parallel ports, SCSI, FireWire ports and infrared ports. Other port technologies undoubtedly already exist or will be developed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

As just one example, while the description has been limited to the use of a silly the telephone for initiating the call resulting in the acquisition of social information about the called party, the call could be placed by almost any kind of telephone or "all-in-one" PDA device or even computing system having call completion capabilities.

What is claimed is:

1. A computer-implemented method of acquiring social information about a called party comprising:
   initiating a telephone call to a called number associated to the called party;
   including a request for the social information in call information sent to the called number;
   receiving an identity of each of one or more social information repositories associated to the called party in a call response sent on behalf of the called party;
   when an identity of more than one social information repository is received, selecting one of said social information repositories based on information available to a calling party;
   sending an access request to the selected one of said social information repositories; and
   receiving social information sent on behalf of the called party.

2. A computer-implemented method according to claim 1 further including selecting one social information repository based on call properties when more than one social repository is identified.

3. A computer-implemented method according to claim 1 further including selecting one social information repository when more than one social repository is identified by:
   displaying information about all identified social information repositories to the calling party; and
   receiving a selection of one of the social information repositories from the calling party.

4. A computer-implemented method according to claim 2 further including updating a social information repository associated to the calling party using received social information sent on behalf of the called party.

5. A computer-implemented method according to claim 3 further including updating a social information repository associated to the calling party using received social information sent on behalf of the called party.

6. A computer-implemented method according to claim 4 further including displaying received social information about the called party on a display device being used by the calling party.

7. A computer-implemented method according to claim 5 further including displaying received social information about the called party on a display device being used by the calling party.

8. A computer-implemented method according to claim 7 further including deferring completion of a voice connection to the called number until received social information is made available to the calling party.

9. A non-transitory tangible computer medium having computer program code embodied therewith for acquiring social information about a called party, said non-transitory tangible computer medium comprising:
   computer program code configured to initiate a telephone call to a called number associated to the called party;
   computer program code configured to include a request for the social information in call information sent to the called number;
   computer program code configured to receive an identity of each of one or more social information repositories associated to the called party in a call response sent on behalf of the third party;
   computer program code for determining when identities are received for more than one social information repository associated to the called party;
   computer program code responsive to a determination that identities for more than one social information repository have been received to select one of said social information repositories based on information available to a calling party;
   computer program code configured to send an access request to the selected one of said social information repositories; and
   computer program code configured to receive social information sent from the selected one of said social information repositories on behalf of the called party.

10. A non-transitory tangible computer medium according to claim 9 further including computer program code configured to select one social information repository based on call properties when more than one social repository is identified.

11. A non-transitory tangible computer medium according to claim 9 further including computer program code configured to select one social information repository when more than one social repository is identified, said computer usable program code further comprising:
    computer program code configured to generate a display of information about all identified social information repositories; and
    computer program code configured to receive a selection of one of the social information repositories from the calling party.

12. A non-transitory tangible computer medium according to claim 10 further including computer program code configured to update a social information repository associated to the calling party using received social information sent on behalf of the called party.

13. A non-transitory tangible computer medium according to claim 11 further including computer program code configured to update a social information repository associated to the calling party using received social information sent on behalf of the called party.

14. A non-transitory tangible computer medium according to claim 12 further including computer program code configured to display received social information about the called party on a display device being used by the calling party.

15. A non-transitory tangible computer medium according to claim 13 further including computer program code configured to display received social information about the called party on a display device being used by the calling party.

16. A non-transitory tangible computer medium according to claim 15 further including computer program code configured to defer completion of a voice connection to the called number until received social information is made available to the calling party.

17. A computer-based system for acquiring social information about a called party in response to a telephone call from a calling party to a called telephone number associated to the called party, said system comprising:
 a detector for detecting a social information acquisition prefix in calling data received from the calling party;
 logic for including a request for the social information in call information sent to the called telephone number, the request including a request for identification of one or more accessible social information repositories associated to the called party;
 logic for determining when there is more than one social information repository associated to the called party and for selecting one of said social information repositories based on information available to a calling party;
 logic for sending a request for access to the selected social information repository; and
 logic for receiving social information sent on behalf of the called party.

18. A computer-based system according to claim 17 further including logic for selecting one social information repository based on call properties when more than one social repository is identified.

19. A computer-based system according to claim 18 further including update logic for updating a social information repository associated to the calling party using received social information sent on behalf of the called party.

20. A computer-based system according to claim 19 further including a display device and display logic for generating a display of received social information sent on behalf of the called party.

* * * * *